April 7, 1936.  P. SCHMITZ  2,036,646
BED STRUCTURE FOR ILL OR INJURED PERSONS
Filed July 23, 1934   3 Sheets-Sheet 2
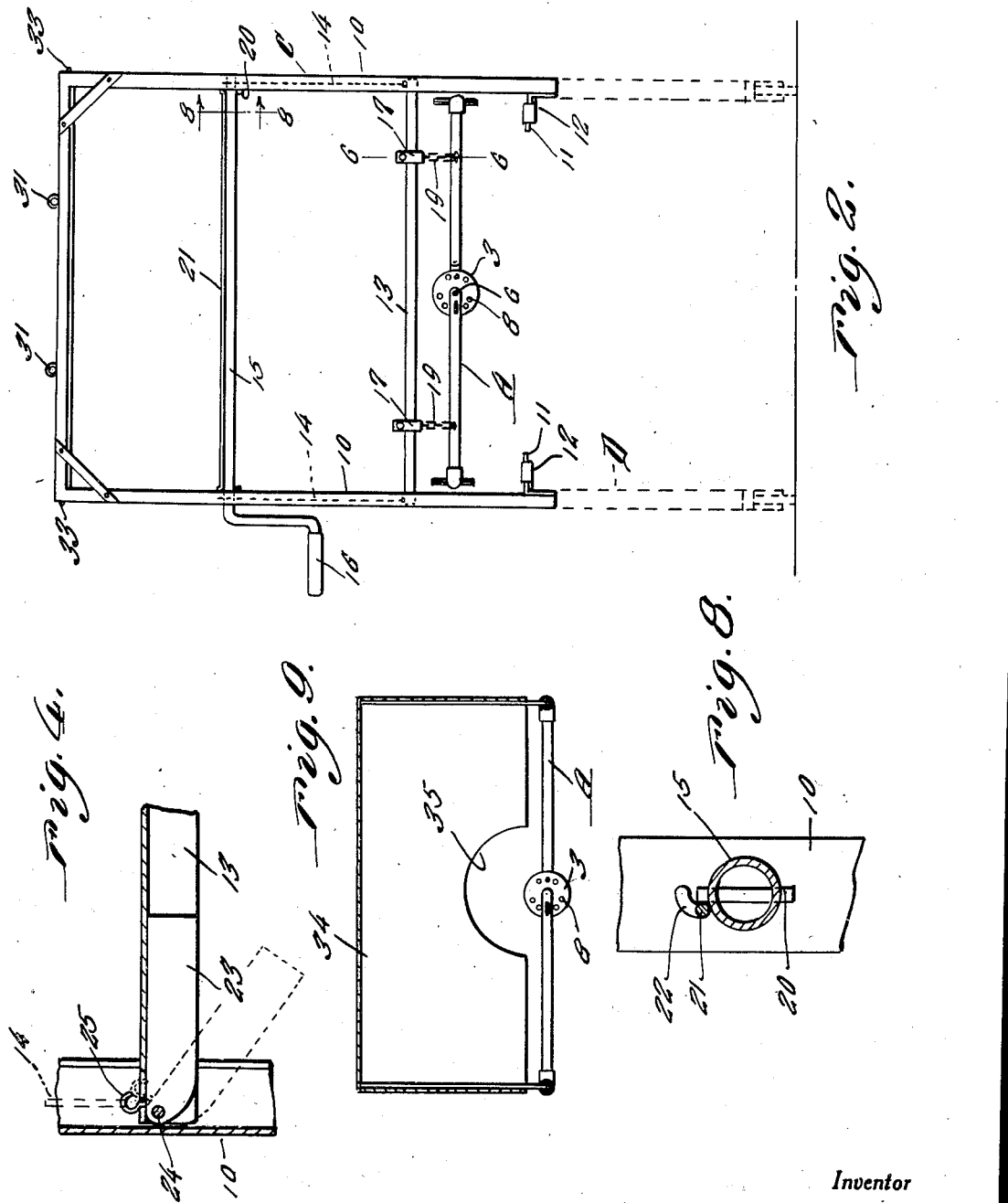
Inventor
Pamphilus Schmitz
By Clarence A. O'Brien
Attorney April 7, 1936.                P. SCHMITZ                2,036,646
                BED STRUCTURE FOR ILL OR INJURED PERSONS
                      Filed July 23, 1934        3 Sheets-Sheet 3
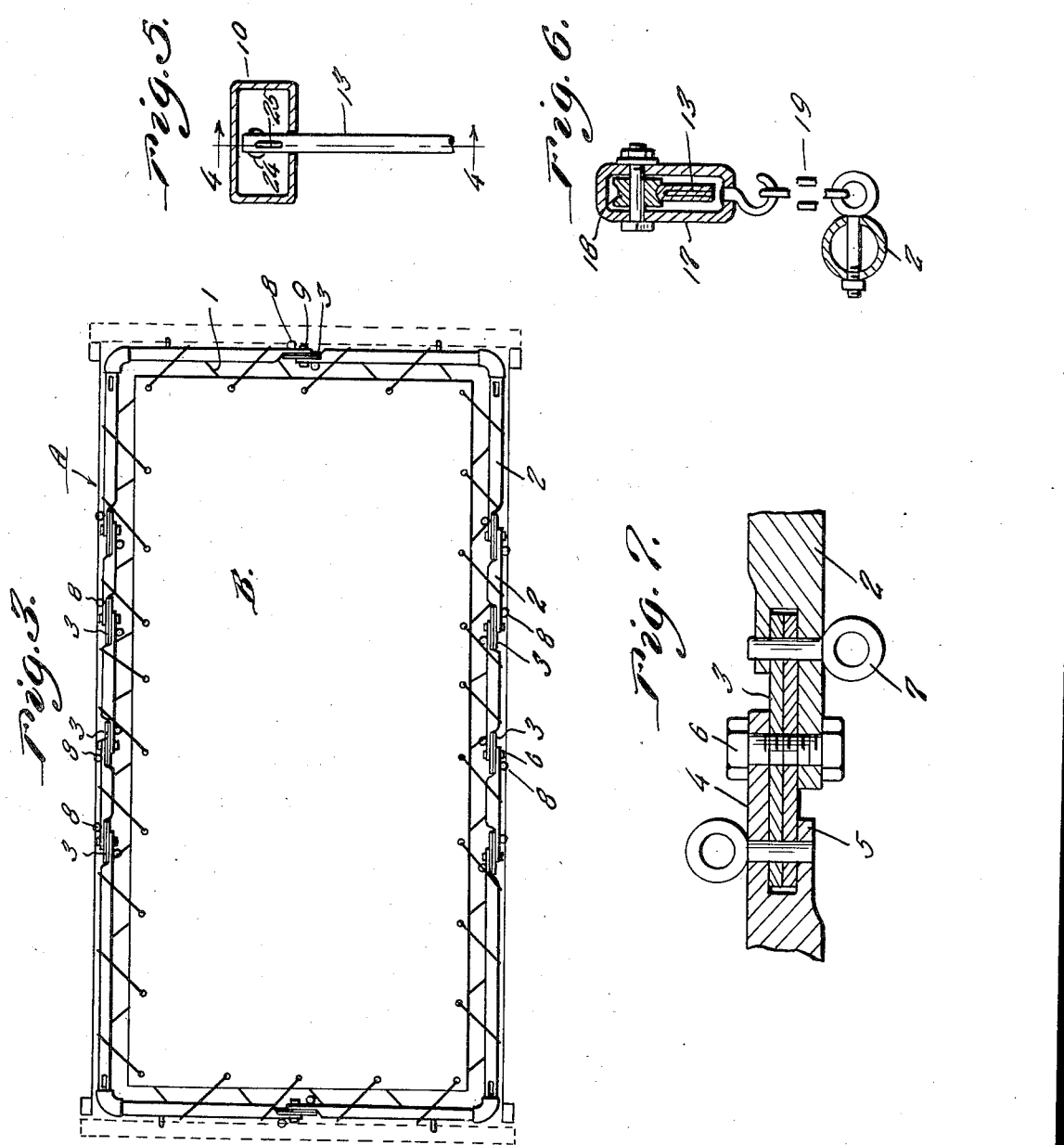
Inventor
Pamphilus Schmitz
By Clarence A. O'Brien
Attorney Patented Apr. 7, 1936

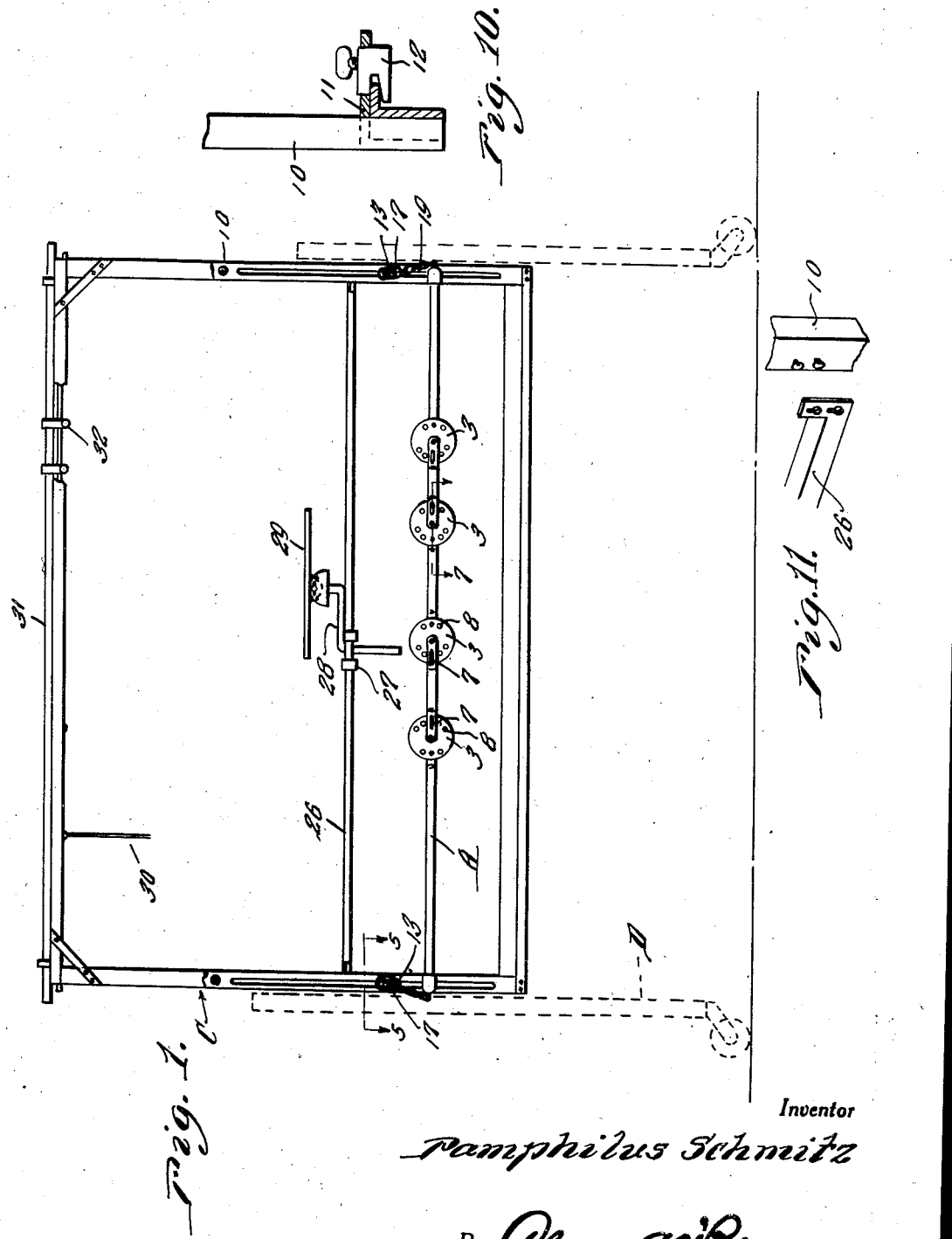

2,036,646

UNITED STATES PATENT OFFICE 2,036,646

BED STRUCTURE FOR ILL OR INJURED PERSONS

Pamphilus Schmitz, Santa Barbara, Calif.

Application July 23, 1934, Serial No. 736,594

2 Claims. (Cl. 5—84)

This invention relates to a bed structure for ill or injured persons, the general object of the invention being to provide an adjustable frame that can be adjusted laterally to raise or lower different parts of the occupant of the bed and which can also be adjusted longitudinally to permit the occupant to be turned over from one side to another and also to provide means for raising and lowering the frame.

Another object of the invention is to provide means whereby the invention can be attached to a bed, with means for preventing the occupant from rolling out of the bed.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a side view of the invention showing the same attached to a bed.

Figure 2 is an end view thereof.

Figure 3 is a top plan view of the bed part.

Figure 4 is a section on the line 4—4 of Figure 5.

Figure 5 is a section on the line 5—5 of Figure 1.

Figure 6 is a section on the line 6—6 of Figure 2.

Figure 7 is a section on the line 7—7 of Figure 1.

Figure 8 is a section on the line 8—8 of Figure 2.

Figure 9 is a transverse sectional view showing a cover device attached to the bed.

Figure 10 is a detail sectional view showing how the device is attached to another bed.

Figure 11 is a detail view showing how a guard rail is attached to a post.

In these drawings, the letter A indicates the bed part which includes a frame and a canvas sheet B which is connected to the frame by the cords 1 shown more clearly in Figure 3. The frame is composed of tubing or the like, the side members of the frame being composed of a plurality of sections 2 adjustably connected together by the disks 3. The adjacent ends of each pair of sections are of forked construction to provide a long prong 4 and a short prong 5 with a pair of disks fitting between the prongs and a bolt 6 passes through the long prongs and the holes in the centers of the pair of disks and pins 7 pass through these prongs and through holes 8 in the disks, a plurality of these holes 8 being provided so that these sections can be adjusted through means of these pins and disks to tilt upwardly or downwardly as desired. A similar arrangement of disks, pins and pivot bolts connect the central portions of the end members of the frame together as shown generally at 9 so that the frame can be folded or partially folded at its longitudinal center to permit the patient to be turned over from one side to another, the adjustments at the sides of the frame permitting the bed part to be adjusted to raise or lower different parts of the body of the patient, giving the patient comfort without endangering the set bones. An upright frame C including corner posts 10, is adapted to be attached to a bed D by the brackets 11 and the clamps 12 as shown more particularly in Figure 10 and these posts 10 are slotted for receiving the ends of the bars 13 which extend across the front and rear of the upright frame. Each bar 13 is connected by cables 14 to a crank shaft 15 supported in the frame C, the cables being located in the posts 10 thereby turning the shaft 15 by its handle 16 the bar can be raised and lowered. A pair of pulley blocks 17 have their pulleys 18 engaging the upper edge of each bar 13 and cables or chains 19 connect these blocks with the end members of the frame A as shown more particularly in Figure 6. Each shaft 15 carries the pins 20 adjacent its ends and a latch bar 21 is adapted to engage the projecting ends of these pins to hold the shaft 15 in adjusted position, with the bed frame A and the rods 13 in the desired position. The ends of each rod 21 are cranked as shown at 22 in Figure 8, to permit the rod 21 to be raised and lowered into operative and inoperative position.

Each bar 13 is of channel shape in cross section and a plate 23 is eccentrically pivoted at each end of the bar as shown at 24 and the cables 14 are connected to the outer ends of these plates as shown at 25, so that if the cables break or the shaft 15 slip from the latching bar 21, these plates 23 will engage parts of the posts 10 and thus lock the bars 13 and the frame A against falling movement.

Guard rails 26 are arranged at the sides of the frame C for preventing a patient from falling out of the bed and these rails are adjustably and removably connected with the posts 10 by slots and pins, see Fig. 9, and they may carry the clamps 27 for the members 28 to support a table 29. One or more straps 30 may be attached to the top of the frame C for enabling an occupant of the bed to pull himself up to sitting position and rods 31 are attached to the top of the frame C for the sliding members 32 for supporting pulleys and cables for attachment to the fractured limbs set. Rods 33 are also attached to the sides of the top of the frame C for supporting curtains for closing the bed structure and the occupant and a canopy such as shown at 34 in Figure 9 may be supported over the occupant of the bed, as shown in this figure, the front end of the canopy having a recess 35 therein which fits over the neck of the patient so that the body will be enclosed but his head will be located outside of the canopy.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In a bed structure, an upright frame, a bed frame, end bars slidably mounted for vertical movement in the upright frame, pulley carrying blocks mounted to travel along said end bars, flexible members connecting said blocks to the end members of the bed frame, a manually operated shaft in each end part of the upright frame, flexible members windable on the shafts and connected to the end bars, latch means for holding the shafts in adjusted position and means for automatically stopping downward movement of the end bars if the flexible means should break.

2. In a bed structure, a rectangular frame including a pair of end members and a pair of side members, each end member being formed of a pair of sections of equal length, a horizontal pivotal connection connecting together the adjacent ends of each pair of sections, each side member being formed of a plurality of sections of different lengths, a horizontal pivotal connection connecting said sections, each pivotal connection of the end and side members including a pair of spaced prongs on each section, one prong being longer than the other, the long prong of one section being reversely arranged to that of the other section, a pair of disks located between the prongs of adjacent sections, a pivot pin passing through the extremities of the two long prongs and through the central portions of the disks, said disks having holes therein adjacent their peripheries, and pins passing through the prongs and through certain of the holes in the disks for locking the parts in adjusted position.

PAMPHILUS SCHMITZ.